United States Patent Office 3,230,189
Patented Jan. 18, 1966

3,230,189
POLYMERIZATION INHIBITION IN OXIRANE-CONTAINING FATTY ACID ESTERS
Robert J. Johnson, Chicago, Harland H. Young, Western Springs, and Thomas W. Findley, La Grange, Ill., assignors to Swift & Company, Chicago, Ill., a corporation of Illinois
No Drawing. Filed Oct. 17, 1960, Ser. No. 62,892
10 Claims. (Cl. 260—23)

This invention relates to the stabilization of esters containing polymerizable oxirane groups and more particularly to a method for decreasing or retarding the tendency for oxirane-containing fatty materials to polymerize under the influence of heat, light, pressure or other polymerization inducing conditions.

Oxirane-containing derivatives of fatty acids such as epoxidized glyceride oils and epoxidized fatty acid esters of mono-, di-, and polyhydric alcohols generally are very effective plasticizer-stabilizers for synthetic resins, particularly halogen-containing synthetic resins. These epoxy esters combat degradation of the vinyl resin, which degradation is accompanied by liberation of hydrochloric acid and very small quantities of the ester are effective for this purpose. Also, the epoxy ester can be employed as a plasticizer for the resin, either in combination with another vinyl plasticizer such as dioctyl phthalate or in case the ester is very compatible with the resin it can be used as the sole plasticizer.

Yet, although the epoxidized fatty material is a potent heat and light stabilizer for the resin and also acts as an effective plasticizer it may in some instances undergo polymerization or cure as evidenced by stiffening or loss of flexibility under the influence of heat or light or other polymerization influences. While in many instances it is desirable to have a polymerizable plasticizer-stabilizer, it is important in other areas of use that such polymerization be held to a minimum or prevented entirely.

Accordingly, it is an object of this invention to provide a polymerizable oxirane-containing fatty acid derivative protected against polymerization by a small amount of a polymerization inhibitor.

Another object of the invention is the provision of a method for inhibiting the polymerization of oxirane-containing fatty material.

Still another object of the invention is the provision of mixtures of vinyl halide polymers and oxirane-substituted fatty acid esters which are protected against loss of flexibility when exposed to cure conditions.

Additional objects, if not specifically set forth herein, will be readily apparent to those skilled in the art from the detailed description of the invention which follows.

Generally, in accordance with this invention, oxirane-containing fatty alkyl derivatives are rendered less likely to polymerize when exposed to polymerization conditions by incorporating with said derivatives a polymerization inhibiting amount of a long-chain substituted urea, an N,N-alkyl substituted formamide salicylamide or caprolactam. These polymerization inhibitors are very effective in stabilizing the epoxy material against gelation or curing since only very small amounts of these stabilizers are required to prevent polymerization of the epoxy groups.

More specifically, the invention comprises oxirane-containing fatty acid esters containing a small amount of certain organic amides and the method for imparting to such esters an increased resistance to polymerization. Epoxy esters, while useful in various industrial applications, are employed most extensively in plasticizing vinyl resins and stabilizing such resins against degradation by loss of halogen in the form of HCl or HBr. Such degradation can result from the effect of heat, pressure, ionizing radiation, ultraviolet light, chemical curing agents such as dibasic and polybasic acids, as well as strong Lewis acids, etc. However, as the oxirane content of the epoxy fatty derivative is increased the tendency for this plasticizer-stabilizer to polymerize is increased because of the greater number of polymerizable oxirane groups. In plasticized vinyl resins where retention of flexibility is required, such polymerization is objectionable. Accordingly, although it may be desirable in order to insure high plasticizer efficiency and higher compatibility to employ an epoxidized ester having a high oxirane content, the higher oxirane content also increases the tendency toward polymerization and the use of an efficient polymerization inhibitor becomes most desirable. It has been found that the stabilizers of this invention provide a very potent polymerization inhibiting effect and, accordingly, can be used either singly or in combination in very small amounts to prepare polymerization-resistant epoxy fatty acid ester plasticizer-stabilizer materials.

The oxirane-containing fatty acid derivatives to which the invention is particularly directed are the mono-, di-, and trihydric alcohol esters of oxirane-containing fatty acids of 10–30 carbons. Esters of such acids with monohydric aliphatic alcohol having 1–8 carbons and esters with dihydric aliphatic alcohols of 2–6 carbons, as well as aliphatic polyhydric alcohol esters, are contemplated. Suitable monohydric alkyl and alkenyl alcohols providing the alcohol moiety of the ester include methyl, ethyl, propyl, isopropyl, butyl, isobutyl, amyl, isoamyl, hexyl, heptyl, and octyl alcohols. Dihydric alcohols include the lower glycols as ethylene glycol, 1,2-propanediol, 1,3-propanediol, diethylmethylene glycol, trimethylene glycol, tetramethylene glycol, up through and including hexamethylene glycol.

Benzenoid alcohols which may be employed in preparing the oxirane-containing fatty acid ester are those benzenoid alcohols having less than 10 carbons and include benzyl, phenyl, 2-phenylethyl, 1-phenylethyl, and nuclear methylated phenyl alcohols.

The polyhydric alcohol esters of oxirane-containing fatty acids include the tri-, tetra-, penta-, and hexahydric alcohol esters of the fatty acid moiety. Included within this group are those aliphatic alcohols having 3–6 carbons and 3 or more alcohol groups. These include glycerol, erythritol, pentaerythritol, and hexitols such as mannitol and sorbitol. Highly epoxidized, low by-product esters such as those disclosed in copending application Serial No. 807,985, filed April 22, 1959, now abandoned, are particularly well suited to treatment in accordance with this invention. These materials, because of their high oxirane content and low hydroxyl and low polymer content, are more compatible with vinyl resins than epoxy esters having a lower oxirane content and greater amount of by-product. Because of this higher level of compatibility, larger amounts of such esters can be employed in plasticizing a vinyl halide polymer without exudation of the plasticizer. Thus, more efficient plasticization may be obtained with these materials. Yet, a corresponding shortcoming is the increased tendency of these high-oxirane materials to polymerize because of the increased number of

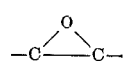

groups in the ester molecule. The polymerization inhibitors of the present invention are particularly valuable when used with these high oxirane esters; that is, those wherein the ester has an oxirane content above about 8.5% oxirane and generally ranging from 8.5–12.3% oxirane oxygen.

The polymerization retarding materials are characterized as organic amides generally although certain groups of compositions and specific compositions have been found particularly effective. Caprolactam, N,N-dimethyl formamide, salicylamide, and monoalkyl and monoalkenyl ureas are outstanding in the prevention or retardation of polymerization of the oxirane composition. The aliphatic hydrocarbon ureas wherein one amino hydrogen is displaced with a long-chain alkyl or alkenyl radical having 10–30 carbons are particularly effective. Representative of this group are dodecyl urea, tridecyl urea, tetradecyl urea, through docosyl urea among the saturated aliphatic hydrocarbyl substituted ureas and the mono-, di-, tri-, tetraethenoid 10–30 carbon aliphatic hydrocarbyl substituted ureas. Also contemplated as the source of the aliphatic group are the aliphatic hydrocarbon radicals derived from naturally occurring fatty acids. Mixtures of fatty acids such as those derived from glyceride oils including animal, vegetable, and marine oils can be treated to produce nitriles, which in turn are reduced to fatty amines. The fatty amines provide the aliphatic hydrocarbon substituent on the urea. Such ureas contain long-chain substituents made up of saturated and mono- and polyunsaturated alkyl groups having 10–30 carbons.

Stability of the oxirane-containing fatty acid derivative and inhibition of polymerization thereof, either alone or in the presence of a halogen-containing polymer, is effected with only a minor amount of the inhibitor. The amount required will vary depending upon the tendency of the epoxy material to polymerize. Esters richer in oxirane groups may require more of the inhibitor than those having a smaller total percentage of oxirane oxygen. Also, the conditions to which an epoxy fatty composition in combination with a halogen-containing resin are exposed similarly affects the amount of inhibitor required. More severe polymerization conditions require that a greater amount of the inhibitor be employed. Thus, it is not practicable to recommend an amount of inhibitor that will be satisfactory for all oxirane-containing materials and all conditions to which the material may be exposed.

Polymerization inhibition is discernible in those cases where more than about 0.1% based on the amount of the oxirane-containing ester is added to and embodied in said ester. For most oxirane-containing material around 2–5% based on the weight of the inhibitor provides protection. More than about 10% based on the weight of the oxirane-containing material is seldom required and may be economically unfeasible.

In order to determine the effectiveness of the various polymerization inhibitors in preventing or retarding polymerization of the oxirane group, certain tests have been devised.

EXTRACTION TEST

Although the use of the stabilized esters is not limited to plasticizer-stabilizers for vinyl resins this is a primary field of use and, accordingly, performance characteristics for the inhibitor can be determined in a vinyl halide resin system by the following procedure: 1 part of the inhibitor is added to 50 parts of the oxirane-containing fatty acid ester and this ester containing inhibitor is added to and admixed with an equal amount of polyvinyl chloride resin. The mixture is then heated in an oil bath at 170–180° C. for 90 minutes. After cooling to room temperature, the resinous oily material is comminuted and the comminuted mixture is extracted with cyclohexanone to remove that amount of the epoxy ester which has not polymerized. The residue remaining after extraction is the polymerized epoxy fatty acid ester. The polymerized material is weighed and the amount of the epoxy ester employed which has polymerized is determined by difference.

A sample of 50 grams epoxidized linseed oil (oxirane content 9.2%) was blended with 50 grams of polyvinyl chloride resin (Geon 121)[1] and 6.7 grams of the mixture was placed in a test tube. The tube was heated in an oil bath at 175° C. for 90 minutes and then cooled. The residue was broken up and extracted in a Soxhlet extractor for several hours using cyclohexanone as the solvent for both the polyvinyl chloride and the nonpolymerized epoxidized oil. The insoluble residue of polymerized epoxidized linseed oil weighed 3.10 grams, representing 92.8% of the original epoxidized oil which had been polymerized to the point of being insoluble in the cyclohexanone solvent. A similar run to which 1 gram of caprolactam had been added and a further run to which 1 gram of dodecenyl urea had been added provided insoluble residues of 0.005 gram and 0.004 gram, indicating that only 0.15% and 0.12% of the original oil had polymerized.

During the processing of polyvinyl chloride resins it is often necessary to expose the resins to conditions of elevated temperatures and/or pressure. At these high temperatures the vinyl halide resin exhibits a tendency to decompose, particularly if exposure to high temperature is for an extended period of time, with the production of HCl or HBr. The accumulation of charred resin in extrusion apparatus is a condition familiar to vinyl halide resin fabricators. The following method is believed to simulate the conditions in a system where the vinyl halide resin is broken down and HCl or HBr is produced.

In all of the following examples epoxidized linseed oil having an oxirane content of 9.0±0.4% was used. All of the inhibitor materials were added in an amount of 2% based on the weight of the oxirane-containing oil. The stabilized oil was blended with polyvinyl chloride resin in a ratio of 1 to 1. The mixture was placed in a 3 inch 20 cc. test tube in an amount sufficient to half fill the tube. These tubes were then held in a circulating air oven at 210° C. until decomposition evidenced by foaming had filled the tube to the top. The time in minutes required for this degree of decomposition to take place was recorded as the end point. The following table shows the results of these tests.

*Table I*

| Sample No. | Stabilizer added | Time for decomposition to develop, min. | Remarks |
| --- | --- | --- | --- |
| Control | None | 15 | Ineffective. |
| Sample 1 | Phthalamide | 16 | Do. |
| Sample 2 | Acetamido stearic acid. | 15 | Do. |
| Sample 3 | Napthyl tallow urea (Sym.). | 18 | Do. |
| Sample 4 | N,N-dimethyl formamide. | 85 | Very effective. |
| Sample 5 | Caprolactam | 110 | Do. |
| Sample 6 | Octadecenyl urea | 110 | Do. |
| Sample 7 | Salicylamide | 120 | Do. |
| Sample 8 | Soya urea | 125 | Do. |
| Sample 9 | Tallow urea | 130 | Do. |

The soya urea and tallow urea are so designated inasmuch as the fatty amine used in the synthesis of the urea was derived from the naturally occurring material noted. These urea derivatives are synthesized by hydrogenating commercially available fatty acid nitriles and dissolving the amine in methanol and neutralizing with a mineral acid such as hydrochloric acid or sulfuric acid. An equimolar quantity of potassium cyanate dissolved in a minimum amount of cold water is quickly added to the methanol solution of the amine salt and the mixture held at 40–50° C. with adequate stirring. An inorganic salt separates and the alkyl urea crystallizes upon cooling.

[1] From B. F. Goodrich Chemical Co.

This product is easily purified by washing with cold water to remove inorganic salts.

In the stability test noted above, very effective stabilizers are those which retard polymerization for 1–2 hours and the stabilizing effect is particularly striking when one compares the effect of the inhibitors of this invention to the same sample with no inhibitor added.

The polyvinyl halide resins employing the stabilized epoxy fatty acid esters as plasticizers are useful in all of the usual areas where polyvinyl halide resins are currently employed. These inhibited oils are particularly desirable in molding, extrusion, and other fabricating procedures where exposure to high temperatures for long periods of time is expected.

Resins which may be advantageously plasticized and/or stabilized with these oxirane-containing fatty acid esters are those vinyl polymers in which at least 50% of the monomer units are vinyl halide units. This includes primarily vinyl halide polymers such as polyvinyl chloride, polyvinyl bromide, polyvinyl fluoride, vinyl chloride-vinylidene chloride copolymers, and vinyl chloride-vinyl acetate copolymers, as well as interpolymers or homopolymers of vinyl halides. Other vinyl-containing monomers which may be copolymerized with the vinyl halide include vinyl ketones such as vinyl butyl ketone, the acrylates, and the lower alkyl esters of maleic and fumaric acid. These compositions are well known in the art. Additionally, chloroprene rubber and other materials which tend to lose hydrogen halide or hydrogen cyanide under the influence of light and heat may also be employed.

Obviously many modifications and variations of the invention as hereinbefore set forth may be made without departing from the spirit and scope thereof, and therefore only such limitations should be imposed as are indicated in the appended claims.

We claim:

1. As a composition of matter, an ester of an oxirane-containing higher fatty acid of about 10–30 carbon atoms, and an alcohol selected from the group consisting of monohydric and polyhydric alcohols stabilized against gelation with a polymerization inhibiting amount of an amide material selected from the group consisting of caprolactam, salicylamide, N,N-dimethyl formamide, mono-octadecenyl urea, monosoya urea and monotallow urea.

2. The composition of claim 1 wherein the amide is caprolactam.

3. The composition of claim 1 wherein the amide is salicylamide.

4. The composition of claim 1 wherein the amide is N,N-dimethyl formamide.

5. The composition of claim 1 wherein the amide is mono-octadecenyl urea.

6. The composition of claim 1 wherein the amide is monosoya urea.

7. The composition of claim 1 wherein the amide is monotallow urea.

8. An epoxidized glyceride and a polymerization inhibiting amount of an amide material selected from the group consisting of caprolactam, salicylamide, N,N-dimethyl formamide, mono-octadecenyl urea, monosoya urea and monotallow urea.

9. A vinyl resin composition stabilized against premature curing and decrease in flexibility, comprising a polyvinyl halide resin, an ester of an oxirane-containing higher fatty acid of about 10–30 carbon atoms and an alcohol selected from the group consisting of monohydric and polyhydric alcohols, and a cure inhibiting amount of a material selected from the group consisting of caprolactam, salicylamide, N,N-dimethyl formamide, mono-octadecenyl urea, monosoya urea and monotallow urea.

10. The composition of claim 9 wherein the ester is an epoxidized glyceride.

References Cited by the Examiner

UNITED STATES PATENTS

| | | | |
|---|---|---|---|
| 2,393,763 | 1/1946 | Fallesen et al. | 260—45.9 |
| 2,595,619 | 5/1952 | Voorthuis | 260—45.9 |
| 2,681,330 | 6/1954 | Stanton et al. | 260—45.9 |
| 2,686,764 | 8/1954 | Geister et al. | 260—23 |
| 2,863,851 | 12/1958 | O'Brien | 260—45.9 |
| 2,893,973 | 7/1959 | Steckler et al. | 260—47 |
| 2,899,398 | 8/1959 | Pflaumer | 260—23 |
| 2,935,517 | 5/1960 | Gall et al. | 260—348 |

MURRAY TILLMAN, *Primary Examiner.*

A. SULLIVAN, MILTON STERMAN, DONALD E. CZAJA, *Examiners.*